(12) United States Patent (10) Patent No.: US 12,625,817 B1
Vengalam et al. (45) Date of Patent: May 12, 2026

(54) COST-DRIVEN PREFETCHING

(71) Applicant: Advanced Micro Devices, Inc., Santa Clara, CA (US)

(72) Inventors: Uday Kumar Reddy Vengalam, Hamden, CT (US); John Kalamatianos, Arlington, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/991,031

(22) Filed: Dec. 20, 2024

(51) Int. Cl.
| | |
|---|---|
| *G06F 12/08* | (2016.01) |
| *G06F 12/0811* | (2016.01) |
| *G06F 12/0862* | (2016.01) |
| *G06F 12/0891* | (2016.01) |

(52) U.S. Cl.
CPC ...... *G06F 12/0862* (2013.01); *G06F 12/0811* (2013.01); *G06F 12/0891* (2013.01)

(58) Field of Classification Search
CPC ............. G06F 12/0862; G06F 12/0811; G06F 12/0891
See application file for complete search history.

(56) References Cited

U.S. PATENT DOCUMENTS

| | | | | | |
|---|---|---|---|---|---|
| 2002/0087800 | A1* | 7/2002 | Abdallah | .............. | G06F 9/3455 |
| | | | | | 712/E9.047 |
| 2003/0069926 | A1 | 4/2003 | Weaver et al. | | |
| 2010/0095271 | A1* | 4/2010 | Archambault | ........ | G06F 8/4442 |
| | | | | | 717/110 |
| 2015/0149714 | A1 | 5/2015 | Pugsley et al. | | |
| 2016/0041914 | A1 | 2/2016 | Eckert et al. | | |
| 2016/0188490 | A1* | 6/2016 | Samih | .................. | G11C 7/1072 |
| | | | | | 711/135 |

OTHER PUBLICATIONS

Ansari, et al., "MANA: Microarchitecting a Temporal Instruction Prefetcher", Cornell University, arXiv.org, [retrieved from the internet on Mar. 7, 2025], <https://arxiv.org/pdf/2102.01764>, Feb. 2, 2021, 24 Pages.
Bera, et al., "Hermes: Accelerating Long-Latency Load Requests via Perceptron-Based O-Chip Load Prediction", Cornell University, arXiv.org, [retrieved from the internet on Mar. 7, 2025], <https://arxiv.org/pdf/2209.00188>, Sep. 30, 2022, 19 pages.
(Continued)

*Primary Examiner* — Tracy C Chan
(74) *Attorney, Agent, or Firm* — FIG. 1 Patents

(57) ABSTRACT

Systems and techniques for cost-based prefetching are described. In one example, a processor includes a cache system having a hierarchy of one or more cache levels and an instruction prefetcher associated with a cache level of the cache system. The instruction prefetcher encodes fetch requests to a prefetcher table and determines a cost associated with each entry based on a memory level from where the instructions associated with the fetch requests were fetched. The instruction prefetcher evicts entries in the prefetcher table based on the cost associated with one or more corresponding fetch requests in response to adding new entries. The described techniques hide instruction fetch latency that a processor frontend experiences with workloads that have code working sets that do not fit in higher levels of the cache system.

20 Claims, 5 Drawing Sheets

(56)            References Cited

OTHER PUBLICATIONS

Ferdman, et al., "Temporal Instruction Fetch Streaming", 2008 41st IEEE/ACM International Symposium on Microarchitecture. IEEE, 2008, [retrieved from the internet on Mar. 7, 2025], <https://compas.cs.stonybrook.edu/~mferdman/downloads.php/MICRO08_Temporal_Instruction_Fetch_Streaming.pdf>, 2008, 10 pages.
Godala, et al., "PDIP: Priority Directed Instruction Prefetching", ASPLOS '24, Apr. 27-May 1, 2024, La Jolla, CA, USA, [retrieved from the internet on Mar. 7, 2025], <https://cseweb.ucsd.edu/~tullsen/asplos24_pdip.pdf>, 2024, 16 pages.
Kanev, et al., "Profiling a warehouse-scale computer", Proceedings of the 42nd Annual International Symposium on Computer Architecture [retrieved May 10, 2023]. Retrieved from the Internet <https://pub-tools-public-publication-data.storage.googleapis.com/pdf/44271.pdf>., Jun. 13, 2015, 12 Pages.
Kolli, et al., "RDIP: Return-address-stack Directed Instruction Prefetching", Proceedings of the 46th Annual IEEE/ACM International Symposium on Microarchitecture, [retrieved from the internet on Mar. 7, 2025], <https://akolli.github io/pubs/rdip-micro13.pdf>, 2013, 12 pages.
Kumar, et al., "Blasting Through The Front-End Bottleneck With Shotgun", ASPLOS' 18, Mar. 24-28, 2018, Williamsburg, VA, USA, [retrieved from the internet on Mar. 7, 2025], <https://rakeshk.folk.ntnu.no/pubs/Shotgun_ASPLOS18.pdf>, 2018, 13 pages.
Reinman, et al., "Fetch Directed Instruction Prefetching", Proceedings of the 32nd Annual ACM/IEEE International Symposium on Microarchitecture, Haifa, Israel, 1999, [retrieved from the internet on Mar. 7, 2025], <https://dl.acm.org/doi/pdf/10.5555/320080.320085>, 1999, 12 pages.
Vengalam, et al., "Pursuant to MPEP § 2001.06(b) the applicant brings the following co-pending application to the Examiner's attention:", U.S. Appl. No. 18/990,532, filed Dec. 20, 2024, 41 pages.
Non-Final Office Action issued in U.S. Appl. No. 18/990,532, mailed Jan. 9, 2026, 13 pages.

* cited by examiner

200

400 ⟶

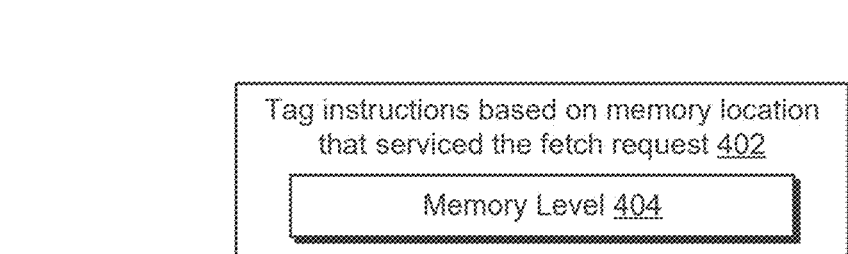

Tag instructions based on memory location
that serviced the fetch request 402

Memory Level 404

Assign cost value to each metadata
entry based on cost class associated
with the memory level 406

Determine cost value per table entry by
summing cost value of corresponding
instructions tracked by the table entry 408

Receive new metadata for instruction(s) to be
saved in the prefetcher table 410

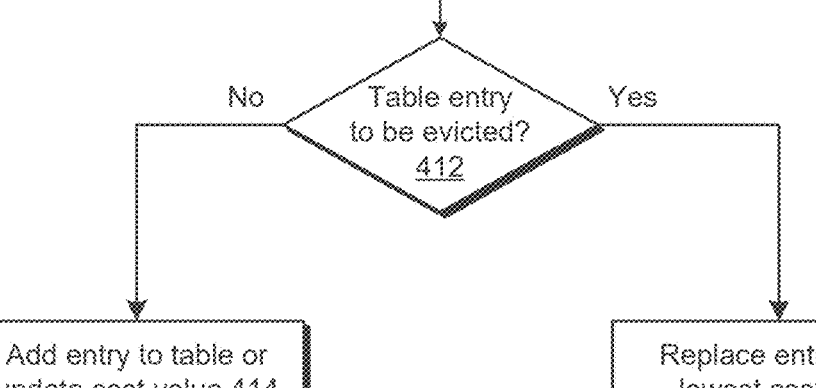

No ⟵ Table entry
to be evicted?
412 ⟶ Yes

Add entry to table or
update cost value 414

Replace entry with
lowest cost 416

FIG. 4

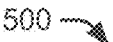
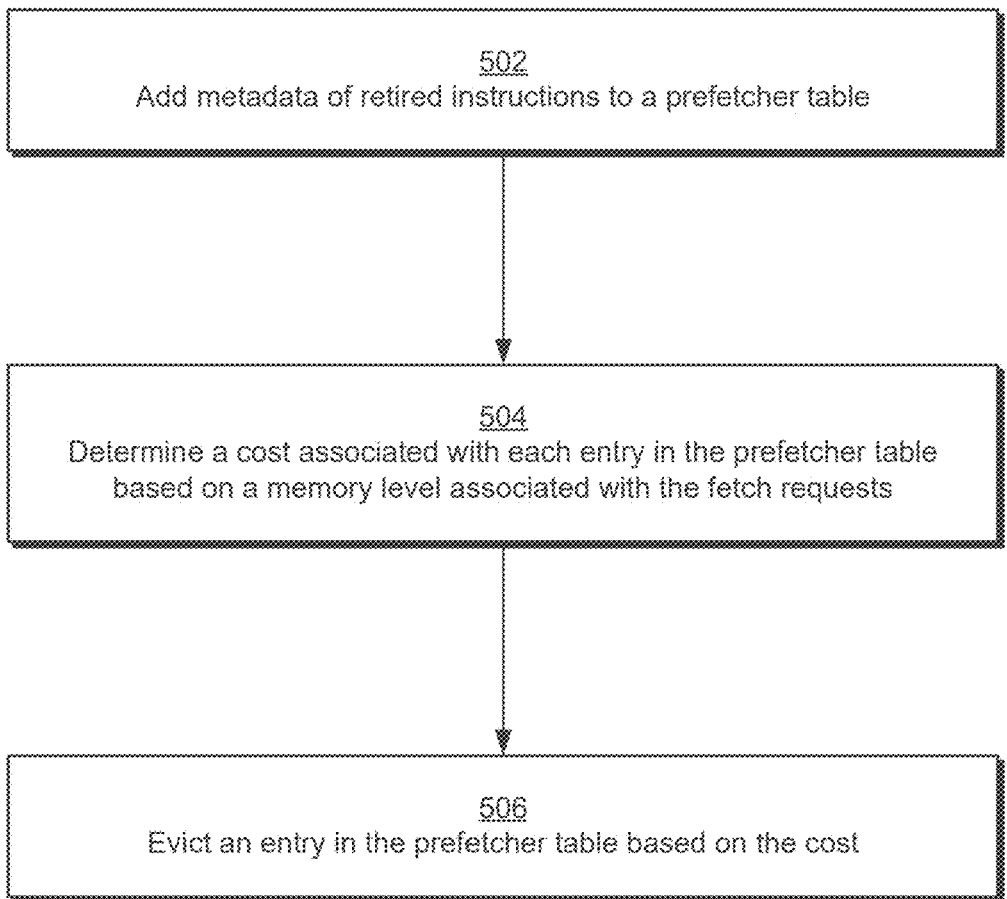
502
Add metadata of retired instructions to a prefetcher table
504
Determine a cost associated with each entry in the prefetcher table based on a memory level associated with the fetch requests
506
Evict an entry in the prefetcher table based on the cost
FIG. 5

COST-DRIVEN PREFETCHING

BACKGROUND

Memory systems are slower than processors, creating a speed gap that processors address using multiple levels of caches. Caches store frequently accessed instructions and data for rapid retrieval. However, as the code footprint of certain workloads grows larger, the instructions or data needed by an application exceed the level one cache capacity, leading to more cache misses, higher access latency, and reduced performance. One way to address this issue is by employing prefetchers to anticipate future control flow of a workload and prefetch it into the level one cache before it is requested, helping to mitigate the performance degradation from cache misses.

BRIEF DESCRIPTION OF THE DRAWINGS

FIG. 4 depicts an example procedure for assigning cost values to prefetched instructions and determining evictions from a prefetcher table in accordance with one or more implementations.

FIG. 5 depicts a procedure in an example implementation of cost-driving instruction prefetching.

DETAILED DESCRIPTION

Overview

Figure 1:
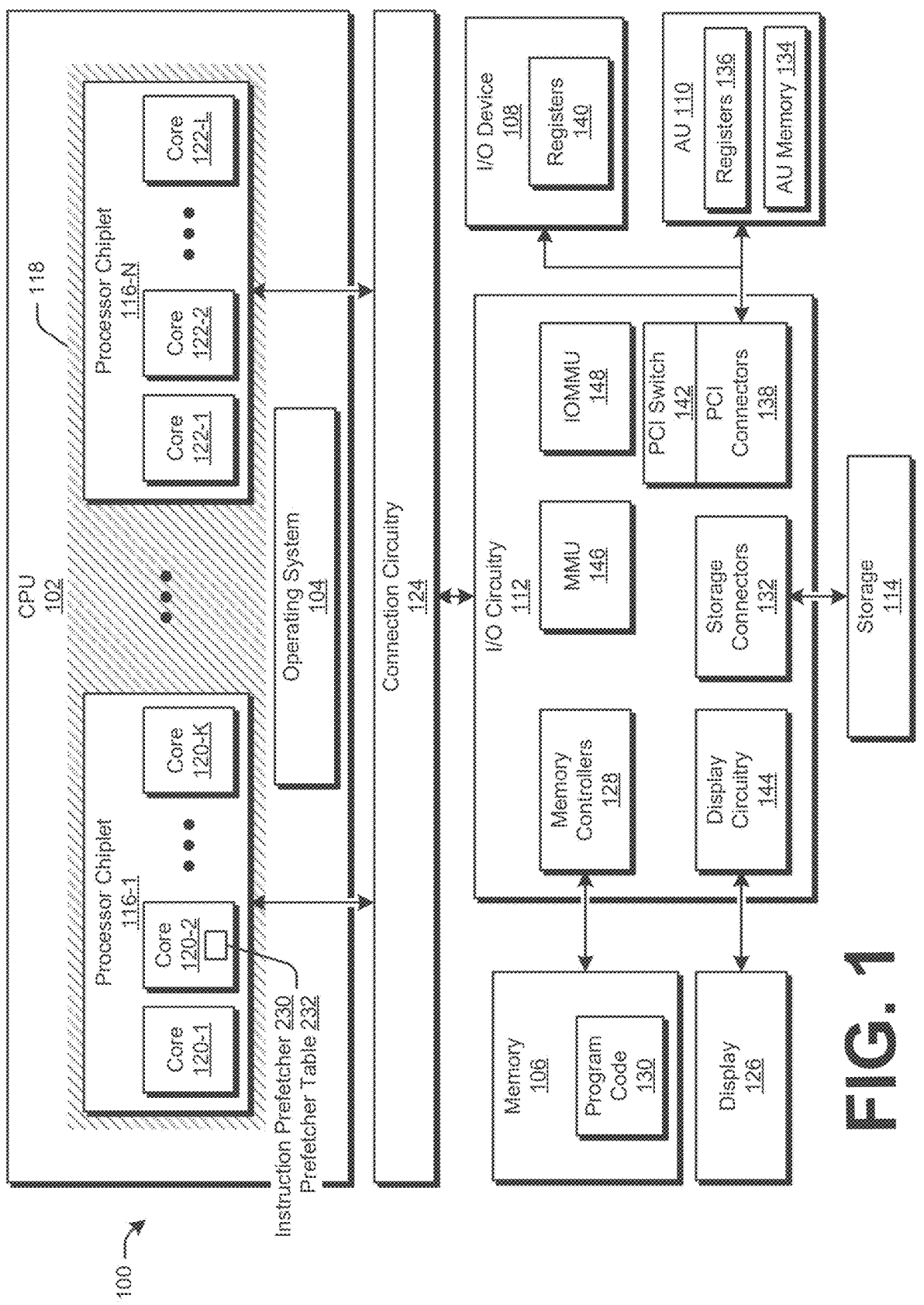
FIG. 1 depicts a block diagram of a processing system configured to execute one or more applications in accordance with one or more implementations.

An example system includes a processor or system on a chip (SoC) with one or more processor cores communicatively coupled to a memory system with volatile and non-volatile memory. The processor includes a cache system with multiple cache levels. For example, the cache system includes level one caches and level two caches that are private to respective cores of the processor, and a last level cache that is shared among the multiple cores of the processor. The processor further includes an instruction prefetcher associated with one or each cache level. Broadly, the instruction prefetcher is configured to prefetch instructions that are predicted to be accessed by a workload from a slower memory source in terms of memory access speed (e.g., the level two instruction cache, the last level instruction cache, the volatile memory, or the non-volatile memory) into the level one instruction cache.

Some applications, such as applications on enterprise servers or in the cloud domain, have too large of code footprints to fit in higher cache levels (e.g., level one or level two caches) and are prefetched or stored in lower levels (e.g., shared level three cache). To tolerate higher access latency, these code footprints are prefetched into caches from level three cache or off-chip memory (e.g., dynamic random access memory (DRAM)). However, as the number of processor cores in systems increases and the number of channels to memory increases, prefetching instructions and data from the lower memory levels is more expensive and results in longer minimum and average roundtrip latency.

For example, long-latency instruction fetches result in frequent front-end stalls, especially for out-of-order processor cores, limiting the instruction-level parallelism (ILP) and the overall instructions per cycle (IPC) per thread. Consistent instruction fetching is also important to maintain high utilization of arithmetic logic units (ALUs), including both vector and scalar ALUs.

A conventional technique to address these issues is fetch-directed instruction prefetching, which leverages branch prediction to improve instruction prefetching. Branch predictors attempt to predict whether a branch will be taken and, if so, fetch instructions from the targeted address associated with the branch or continue fetching sequentially. In this conventional technique, the branch predictor is decoupled from the instruction fetch pipeline using a fetch target queue (FTQ), which stores predicted instruction addresses that are consumed later by the instruction fetch pipeline in accessing the instruction cache. The branch predictor predicts control flow and sends requests to the FTQ. Fetch requests from the FTQ are inspected on each lookup in the level one instruction cache (L1 IC). In response to a hit, the instructions are provided to the decode pipeline from the L1 IC. In response to a miss, the fetch requests from the FTQ are sent to lower levels of caches.

In contrast, this document describes systems and techniques for cost-driven instruction prefetching. In particular, the systems and techniques utilize hardware-based mechanisms to enable higher performance and low-power instruction prefetching using dedicated tables to track prior fetch activity. Higher performance is accomplished by tracking prior fetch activity that has a higher probability of tolerating missing across a multi-level memory hierarchy. In contrast to conventional techniques that use recency-based replacement policies to manage metadata in a dedicated prefetcher table, the described instruction prefetching uses a memory cost-based replacement policy to manage the metadata of a prefetcher table.

In some aspects, the techniques described herein relate to a processor, comprising instruction prefetching circuitry associated with a cache level of a hierarchy of one or more cache levels, the instruction prefetching circuitry configured to record metadata of fetch requests of instructions retired by a processor in an entry of a prefetcher table, determine, based on a memory level providing the instructions of the fetch requests, a cost associated with each entry of the prefetcher table, and in response to adding a new entry in the prefetcher table, evict an entry in the prefetcher table based on the cost.

In some aspects, the techniques described herein relate to a processor wherein the cost is based on the memory level from which one or more corresponding instructions were fetched.

In some aspects, the techniques described herein relate to a processor wherein the cost is recorded upon retirement of the one or more corresponding instructions.

In some aspects, the techniques described herein relate to a processor wherein the cost of an entry is replaced by a new cost in response to a subsequent retirement of the one or more corresponding instructions.

In some aspects, the techniques described herein relate to a processor wherein a new cost is averaged with a previous cost in response to a subsequent retirement of the one or more corresponding instructions.

In some aspects, the techniques described herein relate to a processor wherein the cost is selected from one or more cost classes assigned to multiple memory levels communicatively coupled to the processor based on an instruction fetch latency associated with the multiple memory levels.

In some aspects, the techniques described herein relate to a processor wherein a micro-op cache or a level one instruction cache is assigned to a cost class with a minimum cost value.

In some aspects, the techniques described herein relate to a processor wherein one or more slices within a particular memory level of the multiple memory levels are subdivided into a near-cost class and a far-cost class based on a non-uniform memory access domain associated with the one or more slices.

In some aspects, the techniques described herein relate to a processor wherein the entry evicted from the prefetcher table has a lowest cost value.

In some aspects, the techniques described herein relate to a processor wherein the instruction prefetching circuitry is further configured to, in response to multiple entries having the lowest cost value, use a random selection or a recency policy to determine the entry evicted from the prefetcher table.

In some aspects, the techniques described herein relate to a processor wherein the instruction prefetching circuitry is further configured to not evict an entry in response to the cost associated with the instructions having a cost value lower than each entry in the prefetcher table.

In some aspects, the techniques described herein relate to a system comprising a processor including a cache system with a cache level that includes instruction prefetching circuitry, the processor configured to execute one or more instructions and the instruction prefetching circuitry configured to upon retirement of the one or more instructions by the processor, determine, based on a memory level associated with a fetch request for the one or more instructions, a cost associated with each entry in a prefetcher table tracking metadata for the one or more instructions; and evict an entry in the prefetcher table based on the cost associated with one or more corresponding fetch requests.

In some aspects, the techniques described herein relate to a system wherein the cost is based on the memory level from which one or more corresponding instructions were fetched and the cost is selected from one or more cost classes, assigned to multiple memory levels of the system, based on an instruction fetch latency associated with each of the multiple memory levels.

In some aspects, the techniques described herein relate to a system wherein a fetch response includes an identification of a cost class associated with the memory level from which the one or more corresponding instructions were fetched.

In some aspects, the techniques described herein relate to a system wherein the cost is determined by a combined cost of fetching each cache-line worth of instructions tracked by the entry.

In some aspects, the techniques described herein relate to a system wherein the cost is determined by summing costs assigned to fetching each cache-line worth of instructions.

In some aspects, the techniques described herein relate to a system wherein a new cost replaces a previous cost in response to a subsequent retirement of the one or more instructions.

In some aspects, the techniques described herein relate to a system wherein the entry evicted from the prefetcher table has a lowest cost value.

In some aspects, the techniques described herein relate to a system wherein the instruction prefetching circuitry is further configured to determine, using a presence status in an instruction lookaside buffer, the entry evicted from the prefetcher table in response to multiple entries having the lowest cost value.

In some aspects, the techniques described herein relate to a method comprising recording metadata of fetch requests of data retired by a processor in an entry of a prefetcher table, determining, based on a memory level providing the data of the fetch requests, a cost associated with each entry of the prefetcher table, and in response to adding a new entry in the prefetcher table, evicting an entry in the prefetcher table based on the cost.

FIG. 1 is a block diagram of a processing system configured to execute one or more applications in accordance with one or more implementations. In particular, FIG. 1 includes a processing system 100 configured to execute one or more applications, such as computing applications (e.g., machine-learning applications, neural network applications, high-performance computing applications, databasing applications, gaming applications), graphics applications, and the like. Examples of devices in which the processing system 100 is implemented include but are not limited to a server computer, personal computer (e.g., desktop or tower computer), smartphone or another wireless phone, tablet or phablet computer, notebook computer, laptop computer, wearable device (e.g., smartwatch, augmented reality headset or device, virtual reality headset or device), entertainment device (e.g., gaming console, portable gaming device, streaming media player, digital video recorder, music or another audio playback device, television, set-top box), Internet of Things (IoT) device, automotive computer or computer for another type of vehicle, networking device, medical device or system, and other computing devices or systems.

In the illustrated example, the processing system 100 includes a central processing unit (CPU) 102. In one or more implementations, the CPU 102 is configured to run an operating system (OS) 104 that manages the execution of applications. For example, the OS 104 is configured to schedule the execution of tasks (e.g., instructions) for applications, allocate portions of resources (e.g., system memory 106, CPU 102, input/output (I/O) device 108, accelerator unit (AU) 110, storage 114) for the execution of tasks for the applications, provide an interface to I/O devices (e.g., I/O device 108) for the applications, or any combination thereof.

The CPU 102 includes one or more processor chiplets 116, which are communicatively coupled by a data fabric 118 in one or more implementations. Each processor chiplet 116, for example, includes one or more processor cores 120, 122 configured to execute one or more series of instructions concurrently, also referred to herein as "threads" or workloads, for an application. Further, the data fabric 118 communicatively couples each processor chiplet 116-N of the CPU 102 such that each processor core (e.g., processor cores 120) of a first processor chiplet (e.g., 116-1) is communicatively coupled to each processor core (e.g., processor cores 122) of one or more other processor chiplets 116.

Though the example embodiment in FIG. 1 shows a first processor chiplet (116-1) having three processor cores (120-1, 120-2, 120-K) representing a K number of processor cores 122 and a second processor chiplet (116-N) having three processor cores (e.g., 122-1, 122-2, 122-L) representing an L number of processor cores 122, in other implementations (L being an integer number greater than or equal to one), each processor chiplet 116 may have any number of processor cores 120, 122. For example, each processor chiplet 116 can have the same number of processor cores 120, 122 as one or more other processor chiplets 116, a different number of processor cores 120, 122 as one or more other processor chiplets 116, or both.

In this example, the prefetcher table 232, which is part of the instruction prefetcher 230, is depicted in the core 120-2. In variations, however, the instruction prefetcher 230 and prefetcher table 232 are included in and/or are implemented by one or more different components of the processing system 100, such as the other processor cores 120, 122, CPU 102, the AU 110, and so forth. In at least one implementation, the instruction prefetcher 230 and the prefetcher table 232 or portions thereof are included in at least two of the depicted components of the processing system 100 (e.g., each processor core 120, 122).

Examples of connections that are usable to implement the data fabric 118 include but are not limited to buses (e.g., a data bus, a system, an address bus), interconnects, memory channels, and silicon vias, traces, and planes. Other example connections include optical connections, fiber optic connections, and/or connections or links based on quantum entanglement.

Additionally, within the processing system 100, the CPU 102 is communicatively coupled to an I/O circuitry 112 by a connection circuitry 124. For example, each processor chiplet 116 of the CPU 102 is communicatively coupled to the I/O circuitry 112 by the connection circuitry 124. The connection circuitry 124 includes, for example, one or more data fabrics, buses, buffers, queues, and the like. The I/O circuitry 112 is configured to facilitate communications between two or more components of the processing system 100 such as between the CPU 102, system memory 106, display 126, universal serial bus (USB) devices, peripheral component interconnect (PCI) devices (e.g., I/O device 108, AU 110), storage 114, and the like.

As an example, system memory 106 includes any combination of one or more volatile memories and/or one or more non-volatile memories, examples of which include dynamic random-access memory (DRAM), static random-access memory (SRAM), non-volatile RAM, and the like. To manage access to the system memory 106 by CPU 102, the I/O device 108, the AU 110, and/or any other components, the I/O circuitry 112 includes one or more memory controllers 128. The memory controllers 128, for example, include circuitry configured to manage and fulfill memory access requests issued from the CPU 102, the I/O device 108, the AU 110, or any combination thereof. Examples of such requests include read requests, write requests, fetch requests, pre-fetch requests, or any combination thereof. That is to say, the memory controllers 128 are configured to manage access to the data stored at one or more memory addresses within the system memory 106, such as by CPU 102, I/O device 108, and/or AU 110.

When an application is to be executed by processing system 100, the OS 104 running on the CPU 102 is configured to load at least a portion of program code 130 (e.g., an executable file) associated with the application from, for example, a storage 114 into system memory 106. This storage 114, for example, includes a non-volatile storage such as a flash memory, solid-state memory, hard disk, optical disc, or the like configured to store program code 130 for one or more applications.

To facilitate communication between the storage 114 and other components of processing system 100, the I/O circuitry 112 includes one or more storage connectors 132 (e.g., universal serial bus (USB) connectors, serial AT attachment (SATA) connectors, PCI Express (PCIe) connectors) configured to communicatively couple storage 114 to the I/O circuitry 112 such that I/O circuitry 112 is capable of routing signals to and from the storage 114 to one or more other components of the processing system 100.

In association with executing an application, in one or more scenarios, the CPU 102 is configured to issue one or more instructions (e.g., threads) to be executed for an application to the AU 110. The AU 110 is configured to execute these instructions by operating as one or more vector processors, coprocessors, graphics processing units (GPUs), general-purpose GPUs (GPGPUs), non-scalar processors, highly parallel processors, artificial intelligence (AI) processors (also known as neural processing units, or NPUs), inference engines, machine-learning processors, other multithreaded processing units, scalar processors, serial processors, programmable logic devices (e.g., field-programmable logic devices (FPGAs)), or any combination thereof.

In at least one example, the AU 110 includes one or more compute units that concurrently execute one or more threads of an application and store data resulting from the execution of these threads in AU memory 134. This AU memory 134, for example, includes any combination of one or more volatile memories and/or non-volatile memories, examples of which include caches, video RAM (VRAM), or the like. In one or more implementations, these compute units are also configured to execute these threads based on the data stored in one or more physical registers 136 of the AU 110.

To facilitate communication between the AU 110 and one or more other components of processing system 100, the I/O circuitry 112 includes or is otherwise connected to one or more connectors, such as PCI connectors 138 (e.g., PCIe connectors) each including circuitry configured to communicatively couple the AU 110 to the I/O circuitry such that the I/O circuitry 112 is capable of routing signals to and from the AU 110 to one or more other components of the processing system 100. Further, the PCIe connectors 138 are configured to communicatively couple the I/O device 108 to the I/O circuitry 112 such that the I/O circuitry 112 is capable of routing signals to and from the I/O device 108 to one or more other components of the processing system 100.

By way of example and not limitation, the I/O device 108 includes one or more keyboards, pointing devices, game controllers (e.g., gamepads, joysticks), audio input devices (e.g., microphones), touch pads, printers, speakers, headphones, optical mark readers, hard disk drives, flash drives, solid-state drives, and the like. Additionally, the I/O device 108 is configured to execute one or more operations, tasks, instructions, or any combination thereof based on one or more physical registers 140 of the I/O device 108. In one or more implementations, such physical registers 140 are configured to maintain data (e.g., operands, instructions, values, variables) indicating one or more operations, tasks, or instructions to be performed by the I/O device 108.

To manage communication between components of the processing system 100 (e.g., AU 110, I/O device 108) that are connected to PCI connectors 138, and one or more other components of the processing system 100, the I/O circuitry 112 includes PCI switch 142. The PCI switch 142, for example, includes circuitry configured to route packets to and from the components of the processing system 100 connected to the PCI connectors 138 as well as to the other components of the processing system 100. As an example, based on address data indicated in a packet received from a first component (e.g., CPU 102), the PCI switch 142 routes the packet to a corresponding component (e.g., AU 110) connected to the PCI connectors 138.

Based on the processing system 100 executing a graphics application, for instance, the CPU 102, the AU 110, or both are configured to execute one or more instructions (e.g., draw calls) such that a scene including one or more graphics objects is rendered. After rendering such a scene, the processing system 100 stores the scene in the storage 114, displays the scene on the display 126, or both. The display 126, for example, includes a cathode-ray tube (CRT) display, liquid crystal display (LCD), light emitting diode (LED) display, organic light emitting diode (OLED) display, or any combination thereof. To enable the processing system 100 to display a scene on the display 126, the I/O circuitry 112 includes display circuitry 144. The display circuitry 144, for example, includes high-definition multimedia interface (HDMI) connectors, DisplayPort connectors, digital visual interface (DVI) connectors, USB connectors, and the like, each including circuitry configured to communicatively couple the display 126 to the I/O circuitry 112. Additionally, or alternatively, the display circuitry 144 includes circuitry configured to manage the display of one or more scenes on the display 126 such as display controllers, buffers, memory, or any combination thereof.

Further, the CPU 102, the AU 110, or both are configured to concurrently run one or more virtual machines (VMs), which are each configured to execute one or more corresponding applications. To manage communications between such VMs and the underlying resources of the processing system 100, such as any one or more components of processing system 100, including the CPU 102, the I/O device 108, the AU 110, and the system memory 106, the I/O circuitry 112 includes memory management unit (MMU) 146 and input-output memory management unit (IOMMU) 148. The MMU 146 includes, for example, circuitry configured to manage memory requests, such as from the CPU 102 to the system memory 106. For example, the MMU 146 is configured to handle memory requests issued from the CPU 102 and associated with a VM running on the CPU 102. These memory requests, for example, request access to read, write, fetch, or pre-fetch data residing at one or more virtual addresses (e.g., guest virtual addresses) each indicating one or more portions (e.g., physical memory addresses) of the system memory 106. Based on receiving a memory request from the CPU 102, the MMU 146 is configured to translate the virtual address indicated in the memory request to a physical address in the system memory 106 and to fulfill the request. The IOMMU 148 includes, for example, circuitry configured to manage memory requests (memory-mapped I/O (MMIO) requests) from the CPU 102 to the I/O device 108, the AU 110, or both, and to manage memory requests (direct memory access (DMA) requests) from the I/O device 108 or the AU 110 to the system memory 106. For example, to access the registers 140 of the I/O device 108, the registers 136 of the AU 110, and/or the AU memory 134, the CPU 102 issues one or more MMIO requests. Such MMIO requests each request access to read, write, fetch, or pre-fetch data residing at one or more virtual addresses (e.g., guest virtual addresses) which each represent at least a portion of the registers 140 of the I/O device 108, the registers 136 of the AU 110, or the AU memory 134, respectively. As another example, to access the system memory 106 without using the CPU 102, the I/O device 108, the AU 110, or both are configured to issue one or more DMA requests. Such DMA requests each request access to read, write, fetch, or pre-fetch data residing at one or more virtual addresses (e.g., device virtual addresses) which each represent at least a portion of the system memory 106. Based on receiving an MMIO request or DMA request, the IOMMU 148 is configured to translate the virtual address indicated in the MMIO or DMA request to a physical address and fulfill the request.

In variations, the processing system 100 can include any combination of the components depicted and described. For example, in at least one variation, the processing system 100 does not include one or more of the components depicted and described in relation to FIG. 1. Additionally, or alternatively, in at least one variation, the processing system 100 includes additional and/or different components from those depicted. The processing system 100 is configurable in a variety of ways with different combinations of components in accordance with the described techniques.

Figure 2:
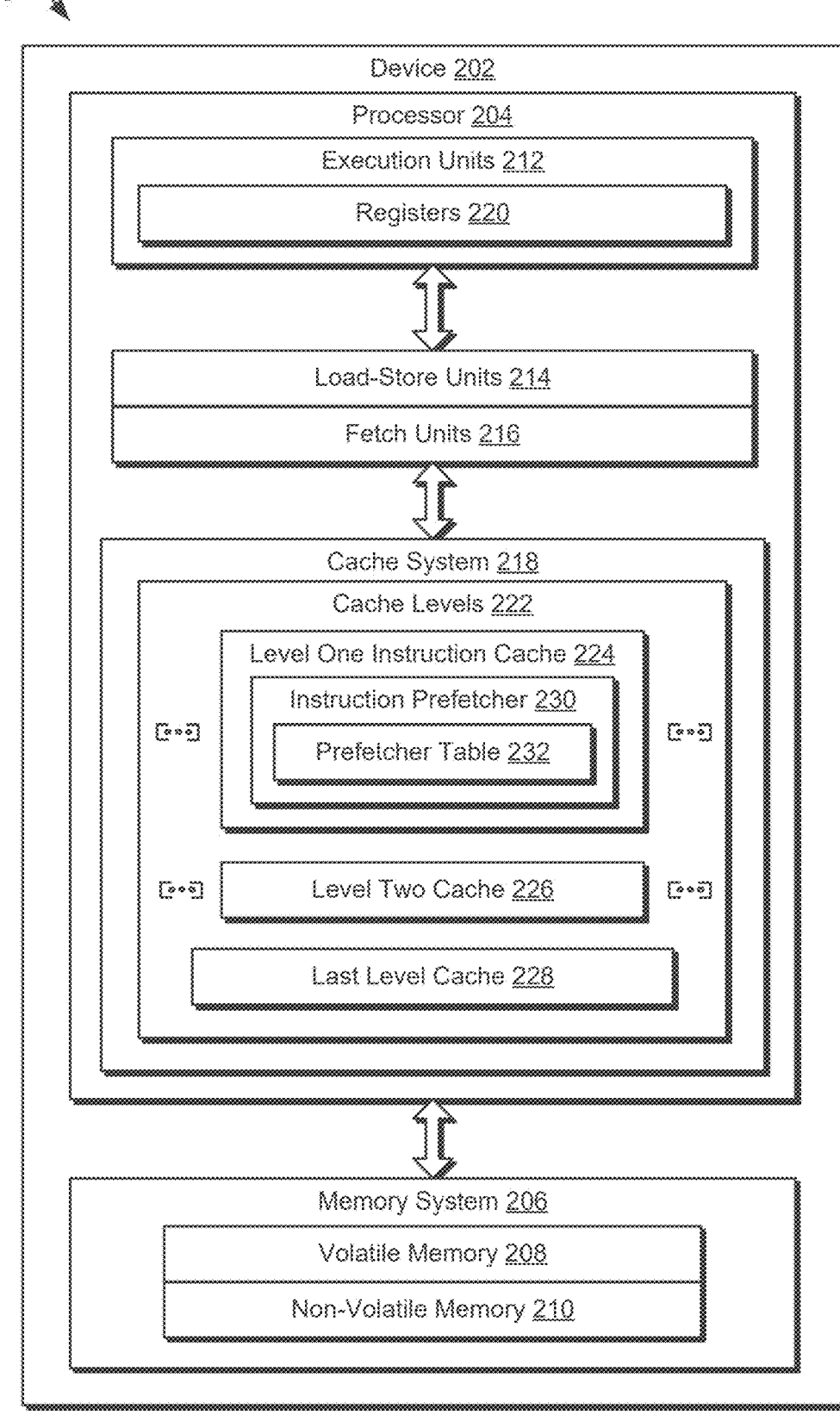
FIG. 2 is a block diagram of a non-limiting example system to implement cost-driven prefetching.

FIG. 2 is a block diagram of a non-limiting example system 200 to implement cost-driven prefetching. The system 200 includes a device 202 having a processor 204 and a memory system 206 having volatile memory 208 and non-volatile memory 210. The device 202 is configurable in a variety of ways. Examples of the device 202 include, by way of example and not limitation, computing devices, servers, mobile devices (e.g., wearables, mobile phones, tablets, laptops), processors (e.g., graphics processing units, central processing units, and accelerators), digital signal processors, disk array controllers, hard disk drive host adapters, memory cards, solid-state drives, wireless communications hardware connections, Ethernet hardware connections, switches, bridges, network interface controllers, and other apparatus configurations. It is to be appreciated that in various implementations, the device 202 is configured as any one or more of those devices listed just above and/or a variety of other devices without departing from the spirit or scope of the described techniques.

In accordance with the described techniques, the processor 204 and the memory system 206 are coupled to one another via one or more wired and/or wireless connections. Example wired connections include, but are not limited to, buses (e.g., a data bus), interconnects, traces, and planes. The processor 204 is an electronic circuit that reads, translates, and executes workloads of a program, e.g., an application, operating system, virtual machine, container, and so on. Examples of the processor 204 include, but are not limited to including, central processing units (CPUs), graphics processing units (GPUs), Field Programmable Gate Arrays (FPGAs), Application Specific Integrated Circuits (ASICs), digital signal processors (DSPs), and accelerator devices.

The volatile memory 208 and the non-volatile memory 210 are devices and/or systems used to store information, such as for use by the processor 204. By way of example, the processor 204 includes a memory module (e.g., a Transflash memory module, a single in-line memory module (SIMM), or a dual in-line memory module (DIMM)), and the memory module is a circuit board (e.g., a printed circuit board) on which the volatile memory 208 and the non-volatile memory 210 are mounted. Further, the volatile memory 208 and the non-volatile memory 210 correspond to semiconductor memory, where data is stored within memory cells on one or more integrated circuits.

Broadly, the volatile memory 208 retains data as long as the device 202 is connected to power, and the data is accessible relatively faster than the non-volatile memory 210. Examples of volatile memory 208 include random-access memory (RAM), dynamic random-access memory (DRAM), synchronous dynamic random-access memory (SDRAM), and static random-access memory (SRAM).

The non-volatile memory 210 retains data even after the device 202 is disconnected from power but is accessible relatively slower than the volatile memory 208. Examples of non-volatile memory include solid state disks (SSD), flash memory, read-only memory (ROM), programmable read-only memory (PROM), erasable programmable read-only memory (EPROM), and electronically erasable programmable read-only memory (EEPROM).

As shown, the processor 204 includes one or more execution units 212, one or more load-store units 214, one or more fetch units 216, and a cache system 218 coupled to one another via one or more wired and/or wireless connections. An execution unit 212 is representative of functionality implemented in hardware (e.g., electronic circuitry) of the processor 204 to perform specific types of workloads, such as arithmetic and logic operations. Further, a load-store unit 214 is representative of functionality implemented in the hardware of the processor 204 to perform load and store operations of data as part of a workload. A fetch unit 216 is representative of functionality implemented in the hardware of the processor 204 to perform load and store operations of instructions requested by a workload. The execution units 212, the load-store units 214, and the fetch units 216 perform respective operations based on requests received through the execution of software programs, e.g., applications, operating systems, virtual machines, containers, and so on. By way of example, requests are generated and forwarded to the execution units 212, the load-store units 214, and/or the fetch units 216 by a control unit (not depicted) of the processor 204.

Load requests instruct the load-store units 214 to load data from the cache system 218, the volatile memory 208, and/or the non-volatile memory 210 into registers 220 of the execution units 212. Similarly, instruction load requests instruct the fetch units 216 to load instructions from the cache system 218, the volatile memory 208, and/or the non-volatile memory 210 into registers 220 of the execution units 212. Once data is loaded into registers 220, instructions become ready to execute by the execution units 212 and perform corresponding operations according to the instruction opcodes.

As illustrated, the cache system 218 includes multiple cache levels 222, including a level one cache which includes both a L1 instruction cache (L1 IC) 224 and a L1 data cache, a level two (L2) cache 226, and a last level (L3) cache 228. By way of example, processor 204 is a multi-core processor, and each respective core includes the L1 IC 224 and L2 cache 226 that are exclusively used by a respective core. Furthermore, the processor 204 includes the L3 cache 228 shared among the multiple cores of the processor 204. The cache system 218 often also includes a micro-op cache (UOP cache) that stores decoded instructions in a format ready for execution.

The cache system 218 corresponds to semiconductor memory where data and instructions are stored within memory cells on one or more integrated circuits. The higher cache levels are accessible (e.g., for loading and/or storing instructions and/or data with the L1 cache and L2 cache 226) relatively faster than the lower cache levels (e.g., L3 cache 228). Lower cache levels in the hierarchy of cache levels generally have greater memory capacity than higher cache levels. In other implementations, the cache system 218 includes differing numbers of cache levels and different hierarchical structures without departing from the spirit or scope of the described techniques.

The cache system 218 is accessible (e.g., for loading and/or storing instructions and data) relatively faster than the memory system 206. The various memory sources of processor 204 are ordered from fastest access speed to slowest access speed in the following order: (1) L1 cache with the L1 IC 224 and L1 data cache, (2) L2 cache 226, (3) L3 cache 228, (4) the volatile memory 208, and (5) the non-volatile memory 210. As a result, a load-store unit 214 executes a load request that includes a memory address by progressively checking the memory sources for the identified data in the aforementioned order. Similarly, a fetch unit 216 executes a load request that includes a memory address by progressively checking the memory sources for the identified instruction in the aforementioned order. For example, if the instruction is present in a memory source, the fetch unit 216 fetches the instruction from that memory source into the L1 IC 224, the processor 204 decodes the instruction and sends it to execution unit 212, where the loaded instruction waits for its operands from the load-store units 214 before being executed by execution units 212. If the instruction is not in a memory source, the fetch unit 216 checks whether the instruction is present in the next memory source.

As illustrated in FIG. 1, the L1 IC 224 includes an instruction prefetcher 230 (e.g., instruction prefetching circuitry), which is representative of functionality implemented in the hardware of the processor 204 to prefetch instructions that are predicted to be used (e.g., in the near future) by a workload of a runtime program. For example, the instruction prefetcher 230 is an electronic circuit that monitors the fetch activity of the workload and predicts which instructions are likely to be accessed. The instruction prefetcher 230 then issues a fetch request to retrieve instructions of the predicted memory address from a slower memory source in terms of access speed (e.g., L2 cache 226, L3 cache 228, the volatile memory 208, or the non-volatile memory 210) into the L1 IC 224. Examples of the instruction prefetcher 230 include but are not limited to dedicated instruction prefetchers that use dedicated tables to track prior fetch activity or fetch directed instruction prefetchers.

Although not depicted, it is appreciated that the L2 cache 226 and L3 cache 228 each can include an instruction prefetcher 230 with similar functionality. Additionally, or alternatively, the instruction prefetcher 230 prefetches instructions from the volatile memory 208 and/or the non-volatile memory 210 into each of the various cache levels 222 of the cache system 218. Regardless of configuration, the prefetch requests issued by the instruction prefetcher 230 improve overall computer performance by accurately prefetching instructions and by maintaining metadata for instructions based on a relative cost to retrieve such instructions from the cache system 218 and/or the memory system 206.

Similarly, it is appreciated that the L1 cache, L2 cache 226, and L3 cache 228 each can include a data prefetcher with similar functionality. Additionally, or alternatively, the data prefetcher prefetches data from the volatile memory 208 and/or the non-volatile memory 210 into each of the various cache levels 222 of the cache system 218. Regardless of configuration, the prefetch requests issued by the data prefetcher improve overall computer performance by accurately prefetching data and maintaining metadata for data based on a relative cost to retrieve such data from the cache system 216 and/or the memory system 206.

Some conventional prefetchers use recency-based replacement policies to store metadata in their tables that are used to determine which instructions or data to prefetch. Recency-based replacement policies result in the least recently accessed metadata being evicted when new metadata is loaded into the prefetcher table. Such policies potentially result in replacing metadata that have a higher probability of prefetching instructions or data which reside in lower memory levels (e.g., L3 cache 228, volatile memory 208, and non-volatile memory 210).

In contrast, the described instruction prefetcher 230 or data prefetcher (not illustrated) assigns a cost for each entry in a prefetcher table 232. The prefetcher table 232 acts as a dedicated table indexed by metadata (e.g., a virtual address, a physical address, or other identification) associated with fetch blocks and is used by the corresponding instruction prefetcher 230 or data prefetcher to generate prefetch requests. The metadata in each entry can include a virtual address, a physical address, or other identifying information for the corresponding instructions (or data) associated with the fetch requests. The instruction prefetcher 230 assigns or determines the cost of each metadata in its table when instructions retire, based on the memory level that services the fetch requests needed to feed the processor 204. Smaller cost values are assigned when instructions are provided by the micro-op cache or L1 IC 224, while higher costs are associated when instructions are provided by higher memory levels. Eviction of metadata entries from the prefetcher table 232 is performed on entries with the lowest cost. In this way, higher-cost metadata entries are maintained in the prefetcher table 232 in favor of those with lower costs, resulting in higher performance and lower power usage for workloads instruction prefetch requests that target code that frequently lies in lower levels of the memory hierarchy and thus suffers from longer memory latency. As a result, the execution units 212 spend less time waiting for instructions, resulting in improved performance.

Figure 3:
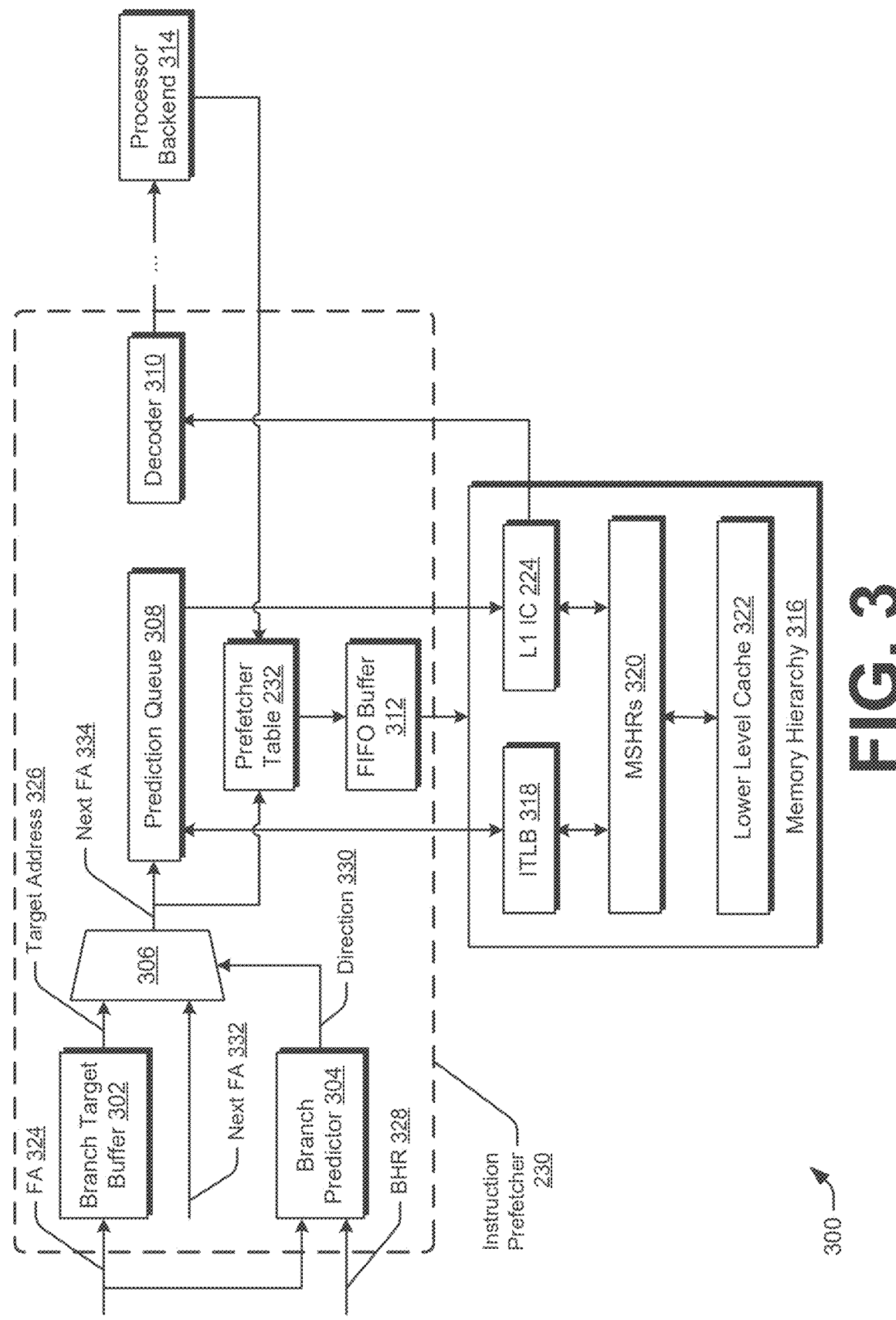
FIG. 3 depicts a non-limiting example of an instruction prefetcher that implements cost-driven instruction prefetching.

FIG. 3 depicts a non-limiting example 300 of an instruction prefetcher that implements cost-driven instruction prefetching. As shown, the example 300 includes the instruction prefetcher 230 and prefetcher table 232 of FIG. 2. The instruction prefetcher 230 also includes a branch target buffer 302, a branch predictor 304, a multiplexer 306, a prediction queue 308, a decoder 310, and a first-in-first-out (FIFO) buffer 312.

The instruction prefetcher 230 is operatively connected to a processor backend 314 that executes instructions, including instructions prefetched by the instruction prefetcher 230. The instruction prefetcher 230 is also operatively connected to a memory hierarchy 316, which includes an instruction translation lookaside buffer (ITLB) 318, the level one instruction cache (L1 IC) 224, miss status holding registers (MSHRs) 320, and a lower level cache 322.

In accordance with the described techniques, the instruction prefetcher 230 uses dedicated tables (e.g., the branch target buffer 302) to track prior fetching activity and trigger prefetches. In one implementation, the instruction prefetcher 230 is a fetch-directed instruction prefetcher (FDIP). The instruction prefetcher 230 is integrated into the front end of a central processing unit (CPU) (e.g., the processor 204), with decoupled fetch and prediction pipelines.

In response to a previous prediction made by the instruction prefetcher 230 that a particular instruction or set of instructions will be required soon, the instruction prefetcher 230 provides the fetch address (FA) 324 of that instruction or set of instructions to the branch target buffer 302 and the branch predictor 304. The fetch address 324 is generally a virtual address, but in some implementations, the fetch address 324 is a physical address. The branch target buffer 302 stores metadata for recently fetched and decoded branch instructions and their corresponding fetch addresses 324. When a fetch address 324 associated with a group of instructions is received, the branch target buffer 302 checks for a matching entry. If a match is located, the branch target buffer 302 predicts the target address 326 of the branch, which is output to the multiplexer 306.

The branch predictor 304 analyzes fetch addresses 324 to anticipate the outcome of branch instructions. The branch predictor 304 also receives branch history recordings (BHRs) 328 (e.g., from branch history registers) that indicate a history of recent branch instructions and their outcomes. Based on this history, the branch predictor 304 predicts whether the current fetch address 324 will lead to the branch instruction being taken (e.g., the branch condition is met) or not taken. The predicted direction 330 of the branch is provided to the multiplexer 306 as a select signal.

In addition to the target address 326 and the direction 330, the instruction prefetcher 230 provides the next fetch address (Next FA) 332 to the multiplexer 306. The next fetch address 332 represents the fetch address of the next instruction or set of instructions following the fetch address 324 (e.g., when the branch instruction(s) not taken). Multiplexer 306 is a digital circuit that selects one of the input signals (e.g., target address 326 or next sequential fetch address 332) based on the direction 330 and forwards the selected signal to the prediction queue 308. The select signal is the direction 330 from the branch predictor 304. The next fetch address 334, which represents the address associated with the next instruction or set of instructions to be prefetched, is provided to the prediction queue 308, ITLB 318, L1 IC 224, and the prefetcher table 232.

Prediction queue 308 stores predicted fetch requests, including the next fetch address 334 output by the multiplexer 306. The prediction queue 308 uses the memory hierarchy 316 to fetch (and prefetch) the instructions using the next fetch address 334 per entry in the prediction queue 308 in order to keep the processor backend 314 busy. The prediction queue 308 smooths out the instructions flow and reduces the likelihood of pipeline stalls due to instruction fetch latency.

ITLB 318 is a (high-speed) cache memory that stores recent virtual-to-physical address translations for instructions. The prediction queue 308 provides the virtual address of the instruction or set of instructions (e.g., the next fetch address 334) to the ITLB 318. The ITLB 318 searches for a matching entry that contains the virtual address and its corresponding physical address. If a matching entry is found (e.g., a hit), the ITLB 318 provides the physical address to the memory hierarchy 316. If no match is found (e.g., a miss), the memory hierarchy 316 consults a page table to perform the translation.

As described above, the L1 IC 224 is a relatively small, high-speed cache that stores recently accessed instructions, which can be accessed more quickly when utilized again. For example, upon receiving the next fetch address 334, the prediction queue 308 checks the L1 IC 224 to determine if the instruction is already stored there. If the instruction is found in the L1 IC 224 (e.g., a hit), the instruction or the set of instructions is sent by the L1 IC 224 to the decoder 310 along with a tag that indicates their source (e.g., L1 IC 224). If the instruction or set of instructions is not found (e.g., a miss), the instruction prefetcher 230 fetches the instruction or set of instructions from the lower level cache 322 or other lower levels of memory.

The MSHRs 320 track the status of outstanding instruction fetch requests. When the instruction prefetcher 230 initiates an instruction prefetch, the memory hierarchy 316 stores information about the request in an MSHR 320, including the virtual address of the instruction, the type of access, and the status of the request (e.g., pending, in-flight, or completed). If the instruction prefetch request results in a cache miss (e.g., a miss at L1 IC 224), the memory hierarchy 316 uses the MSHR 320 to track the request status while the instruction(s) are fetched from the lower level cache 322 or main memory. In addition, the MSHR 320 maintains a tag that records where instructions are fetched (e.g., L2 cache 226, last level cache 226, etc.). The tag is set when the instructions arrive from the cache system 218 or memory system 206.

The decoder 310 interprets the opcode of an instruction to determine the instruction type and the addresses of any operands involved. For example, decoder 310 receives instructions from L1 IC 224 and extracts the opcode(s). A lookup table or other decoding mechanism is used to determine the instruction type (e.g., branch, load, store, or other operation type). The decoder 310 also determines the addresses of some of the operands to fetch or retrieve associated with the instruction or set of instructions from memory.

The processor backend 314 of the processor 204 is responsible for executing instructions using one or more execution units 212, which carries out the operations specified by the instructions. Instructions are dispatched by the decoder 310 or the micro-op cache to the processor backend 314 and are executed when their data becomes available. Upon retirement from the processor backend 314 after execution, instructions along with the tag of the memory source from where the instructions were fetched is provided to the prefetcher table 232. Each instruction is provided with the tag, not just those prefetched from prefetcher table 232.

As described above, the prefetcher table 232 is indexed by the virtual address of each fetch address. Requests generated by the prefetcher table 232 are inserted into the FIFO buffer 312 and do not occupy entries in the prediction queue 308, allowing the branch predictor 304 to continue prefetching along a predicted path. Each entry of the prefetcher table 232 encodes or stores a set of fetch addresses, representing predicted control flow. These fetch addresses correspond to a set of instructions that will be fetched when the prefetcher logic selects the entry of the prefetcher table 232. When a new entry is recorded in the prefetcher table 232, a cost associated with that entry is also recorded based on the memory source that provided each cache line of retired instructions.

FIG. 4 depicts an example procedure 400 for assigning cost values to prefetched instructions and determining evictions from a prefetcher table in accordance with one or more implementations. Although procedure 500 is described in relation to prefetched instructions, procedure 500 is applicable to prefetched data to assign cost values to prefetched data and determine evictions from a prefetcher table in accordance with one or more implementations.

Upon fetching an instruction or group of instructions by the fetch-directed prefetcher or by the prefetcher table 232 from the cache system 218 or memory system 206, the instruction(s) are tagged with the memory level 404 that serviced the corresponding fetch request (block 402). The tags of the instructions are carried over the processor pipeline until the instructions retire by the processor backend 314. When the instruction prefetcher 230 is trained with metadata by retired instructions, the instruction prefetcher 230 assigns a cost value to each metadata entry it allocates for the retired instructions based on a cost class associated with the corresponding memory level 404 (block 406).

The value assigned to each cache-line worth of instructions in the prefetcher table 232 is based on the memory level 404 that serviced the fetch request for that cache line when those instructions were fetched and dispatched to the processor backend 314. For example, a minimum value is assigned if the instructions were dispatched from the micro-operations cache (UOP cache) or L1 IC 224. In one implementation, the fetch response includes an identification of the cost class associated with the memory level from which the one or more corresponding instructions (or data) were fetched. A higher cost value is assigned if the instructions were dispatched from the L2 cache 226. A higher cost value is assigned if the instructions were from the last level cache 228. An even higher cost value is assigned to the instructions dispatched from volatile memory 208 (e.g., DRAM) or non-volatile memory 210. If processor 204 or device 202 supports remote memory accesses (e.g., via CXL-enabled connections to disaggregated memory modules, such as remote DRAM), then the cost value is scaled up accordingly compared to the cache lines fetched from package-attached DRAM (e.g., near DRAM) or in-package integrated DRAM.

In the three-level cache hierarchy illustrated in FIG. 1, instructions are prefetched from one of the following memory sources: L1 IC 224, UOP Cache, L2 cache 226, last level cache 228 (e.g., from the same cache coherence directory (CCD)), remote last level cache (e.g., from a different CCD), volatile memory 208 (e.g., DRAM attached to the device 202), and remote memory (e.g., DRAM attached via CXL). Because the fetch latency from L1 IC 224 and UOP Cache are similar, the instruction prefetcher 230 assigns them to the same cost class. The other hierarchy levels are assigned to different cost classes that are indicative of the relative fetch latency from a corresponding level. In another implementation, the cost class associated with fetched instructions is identified using $\log_2(N)$ bits in the fetch response packet, where N represents the number of supported cost classes.

As the number of processor cores and memory channels per SoC increase and the memory hierarchy becomes more heterogeneous, the instruction prefetcher 230 scales the cost classes to reflect the variability in fetch latency for a single cache-line worth of instructions. For example, a multicore processor with sixteen CCDs generally experiences much higher latency fetching instructions from the CCD that is furthest away from the requesting CCD, compared to the CCD near the requesting CCD. As a result, the remote last level cache can be further broken into cost classes: a near-cost class and a far-cost class. One implementation divides the remote last level cache into "near remote last level cache" and "far remote last level cache." "Near remote last level cache" represents a CCD belonging to the same non-uniform memory access (NUMA) domain as the CCD requesting the instructions. "Far remote last level cache" represents instructions sourced from another NUMA domain, with this class having a higher cost value. In other implementations, the granularity of the remote last level cache increases or decreases based on the number of NUMA domains.

Similarly, the instruction prefetcher 230 utilizes different cost classes for instruction fetches that are directed to DRAM channels located in the same NUMA domain versus those in other NUMA domains (e.g., "near local DRAM" versus "far local DRAM"). The instruction prefetcher 230 similarly introduces different cost classes for remote memory based on the latency required to fetch instructions from the remote memory channels. In other implementations, the instruction prefetcher 230 or the prefetcher table 232 adopts finer or coarser class granularity for different levels of the memory hierarchy.

The instruction prefetcher 230 determines the cost value per table entry by summing the cost value of the set of instructions tracked by the table entry (block 408). The instruction prefetcher 230 allocates new entries and saves metadata for instructions or sets of instructions in the prefetcher table 232 as the instructions retire by the processor backend 314 (block 410). When a set (cache line or other granularity) of instructions retire, the instruction prefetcher 230 determines whether adding metadata for the retired instructions involves evicting metadata for other instructions (block 412).

In response to updating metadata for the same set of instructions retiring again (e.g., a "no" determination in response to block 412), the instruction prefetcher 230 recalculates the cost value and replaces the old value in the entry of the prefetcher table 232 (block 414). In another implementation, the new calculated cost value is averaged with the existing cost value in the entry of the prefetcher table 232. If metadata for the same set of instructions exists in multiple table entries, the table entry tagged with the same control flow signature is updated. If the prefetcher table 232 is not full (e.g., a "no" determination in response to block 412), the instruction prefetcher 230 calculates the cost value for the set of instructions and stores it in a free table entry (block 414).

If the prefetcher table 232 is full and the set of instructions for which new metadata is recorded is not in the table (e.g., a "yes" determination in response to block 412), the instruction prefetcher 230 evicts or replaces the table entry with the lowest cost (block 416). To break ties among entries, the prefetcher table 232 randomly chooses (e.g., static or dynamic random replacement policy (RRIP)) or uses a recency policy (e.g., least recently used (LRU), pseudo-LRU). When combined with a recency-based replacement policy that does not assign a unique recency state per line, the cost policy can break ties during replacement decisions.

In another embodiment, the presence status of instructions, whose metadata is being recorded in the prefetcher table 232, in the ITLB 318 is used to resolve ties in prefetcher-table replacement. In one implementation, the prefetcher table 232 generally retains metadata for sets of instructions associated with instruction pages evicted from the ITLB 318. If a page is evicted from the ITLB 318, there is a high likelihood that the instruction lines of that page will result in L1 IC misses. In addition, a high percentage of sets of instructions following a fetch block with an unconditional branch resides on the same page as the target address 326 of an unconditional branch.

FIG. 5 depicts a procedure 500 in an example implementation of cost-driving instruction prefetching. In the procedure 500, metadata of retired instructions are added to a prefetcher table (block 502). For example, as the instructions from the next fetch address 334 retire at the processor backend 314, the instruction prefetcher 230 adds the metadata for the instructions at the next fetch address 334 to the prefetcher table 232. In other implementations, metadata of retired or used data are added to a prefetcher table. As the data is retired at the processor backend 314, a data prefetcher adds the metadata for the data to the prefetcher table 232.

The instruction prefetcher 230 or the prefetcher table 232 determines a cost associated with each entry of the prefetcher table 232 based on a memory level associated with the fetch requests or the next fetch address (block 504). For example, the cost associated with each entry of the prefetcher table 232 is determined after the retirement of the corresponding instructions (or data) by the processor (e.g., the processor backend 314). The cost associated with each entry is based on the memory level from which the instructions (or data) were fetched. In one implementation, the fetch response to a fetch request for the corresponding instructions includes a cost class identifier associated with the memory level from which the instructions (or data) were fetched.

In one or more implementations, the prefetcher table 232 uses multiple cost classes assignable to the multiple memory levels communicatively coupled to the processor and located within the cache system 218 and the memory system 206. The cost classes are assigned based on an instruction (or data) fetch latency associated with the different memory levels. A micro-op cache (UOP) and the L1 IC 224 are generally assigned to a cost class with a minimum cost value, while the volatile memory 208 or non-volatile memory 210 are assigned to the highest or one of the highest cost classes. In one implementation, slices within a particular memory level (e.g., last level cache 228 or DRAM of volatile memory 208) are subdivided into a near-cost class and a far-cost class based on non-uniform memory access (NUMA) domain associated with each slice. The cost associated with each entry in the prefetcher table 232 is determined by summing costs assigned to each cache line in the entry.

If the entry already has a cost value (e.g., the processor executes the corresponding instructions again), a new cost replaces a previous cost associated with the corresponding instructions (or data). In another implementation, the new cost is averaged with the previous cost.

If the prefetcher table 232 is full (e.g., in response to adding a new unique entry in the prefetcher table), the instruction prefetcher 230 (or data prefetcher) evicts an entry from the prefetcher table 232 based on the cost associated with the corresponding fetch requests (block 506). The evicted entry has the lowest cost value in the prefetcher table 232. If multiple entries have the lowest cost value, the instruction prefetcher 230 (or data prefetcher) uses a random selection, a recency policy, or a presence status in the ITLB 318 to break the tie and select the entry to evict. The described cost-based approach outperforms conventional least recently used (LRU) replacement policies, resulting in better performance for workloads.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the device 202, the processor 204, the memory system 206 having the volatile memory 208 and the non-volatile memory 210, the execution units 212, the load-store units 214, the cache system 218, the instruction prefetcher 230, and the prefetcher table 232) are implemented in any of a variety of different manners such as hardware circuitry, software or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processor, comprising:
    instruction prefetching circuitry associated with a cache level of a hierarchy of one or more cache levels, the instruction prefetching circuitry configured to:
        record metadata of fetch requests of instructions retired by a processor in an entry of a prefetcher table;
        determine, based on a memory level providing the instructions of the fetch requests, a cost associated with each entry of the prefetcher table; and
        in response to adding a new entry in the prefetcher table, evict an entry in the prefetcher table based on the cost.

2. The processor of claim 1, wherein the cost is based on the memory level from which one or more corresponding instructions were fetched.

3. The processor of claim 2, wherein the cost is recorded upon retirement of the one or more corresponding instructions.

4. The processor of claim 3, wherein the cost of an entry is replaced by a new cost in response to a subsequent retirement of the one or more corresponding instructions.

5. The processor of claim 3, wherein a new cost is averaged with a previous cost in response to a subsequent retirement of the one or more corresponding instructions.

6. The processor of claim 2, wherein the cost is selected from one or more cost classes, assigned to multiple memory levels communicatively coupled to the processor, based on an instruction fetch latency associated with the multiple memory levels.

7. The processor of claim 6, wherein a micro-op cache or a level one instruction cache is assigned to a cost class with a minimum cost value.

8. The processor of claim 6, wherein one or more slices within a particular memory level of the multiple memory levels are subdivided into a near-cost class and a far-cost class based on a non-uniform memory access domain associated with the one or more slices.

9. The processor of claim 1, wherein the entry evicted from the prefetcher table has a lowest cost value.

10. The processor of claim 9, wherein the instruction prefetching circuitry is further configured to, in response to multiple entries having the lowest cost value, use a random selection or a recency policy to determine the entry evicted from the prefetcher table.

11. The processor of claim 1, wherein the instruction prefetching circuitry is further configured to not evict an entry in response to the cost associated with the instructions having a cost value lower than each entry in the prefetcher table.

12. A system comprising:
    a processor including a cache system with a cache level that includes instruction prefetching circuitry, the processor configured to execute one or more instructions; and
    the instruction prefetching circuitry configured to:
        upon retirement of the one or more instructions by the processor, determine, based on a memory level associated with a fetch request for the one or more instructions, a cost associated with each entry in a prefetcher table tracking metadata for the one or more instructions; and
        evict an entry in the prefetcher table based on the cost associated with one or more corresponding fetch requests.

13. The system of claim 12, wherein:
    the cost is based on the memory level from which one or more corresponding instructions were fetched; and
    the cost is selected from one or more cost classes, assigned to multiple memory levels of the system, based on an instruction fetch latency associated with each of the multiple memory levels.

14. The system of claim 13, wherein a fetch response includes an identification of a cost class associated with the memory level from which the one or more corresponding instructions were fetched.

15. The system of claim 13, wherein the cost is determined by a combined cost of fetching each cache-line worth of instructions tracked by the entry.

16. The system of claim 13, wherein the cost is determined by summing costs assigned to fetching each cache-line worth of instructions.

17. The system of claim 12, wherein:
    a new cost replaces a previous cost in response to a subsequent retirement of the one or more instructions.

18. The system of claim 12, wherein the entry evicted from the prefetcher table has a lowest cost value.

19. The system of claim 18, wherein the instruction prefetching circuitry is further configured to determine, using a presence status in an instruction lookaside buffer, the entry evicted from the prefetcher table in response to multiple entries having the lowest cost value.

20. A method comprising:
    recording metadata of fetch requests of data retired by a processor in an entry of a prefetcher table;
    determining, based on a memory level providing the data of the fetch requests, a cost associated with each entry of the prefetcher table; and
    in response to adding a new entry in the prefetcher table, evicting an entry in the prefetcher table based on the cost.

* * * * *